United States Patent [19]

Leloux

[11] 4,005,970
[45] Feb. 1, 1977

[54] APPARATUS FOR CONTINUOUSLY PRODUCING SEALS IN TUBE-SHAPED PLASTICS FILM MATERIAL

[75] Inventor: Arnoldus Willem Jan Leloux, Dedemsvaart, Netherlands

[73] Assignee: Wavin B.V., Zwolle, Netherlands

[22] Filed: Feb. 3, 1976

[21] Appl. No.: 654,840

[30] Foreign Application Priority Data

Feb. 3, 1975 Netherlands ............... 7501266

[52] U.S. Cl. .................... 425/392; 425/335; 425/371; 425/336; 425/369; 425/384; 425/396

[51] Int. Cl.² .................... B29C 21/00

[58] Field of Search .......... 425/335, 336, 363, 369, 425/371, 384, 392, 396, 397

[56] References Cited

UNITED STATES PATENTS

| | | | |
|---|---|---|---|
| 3,157,551 | 11/1964 | Granozio | 425/371 X |
| 3,351,977 | 11/1967 | Gasch et al. | 425/335 X |
| 3,859,409 | 1/1975 | Voss et al. | 425/392 X |
| 3,871,809 | 3/1975 | Williams | 425/396 X |
| 3,881,851 | 5/1975 | Allanic et al. | 425/396 X |

*Primary Examiner*—J. Howard Flint, Jr.
*Attorney, Agent, or Firm*—Alan H. Levine

[57] ABSTRACT

Apparatus for continuously producing seals in tube-shaped plastics film material, comprising means for supplying the web of material, at least one heating beam travelling along with the web and subsequently returning, means for keeping the web mechanically tension-free at the location where it is warm, means for keeping the heated film layers one against the other up to a pressing station, said pressing station comprising two rollers at least one of which is provided with cooling means, and means for discharging the web. A plurality of heating beams being provided which are interconnected by flexible and longitudinally adjustable means such as belts so as to form an endless loop which is guided over and driven by appropriate adjustable tensioning rollers.

16 Claims, 4 Drawing Figures

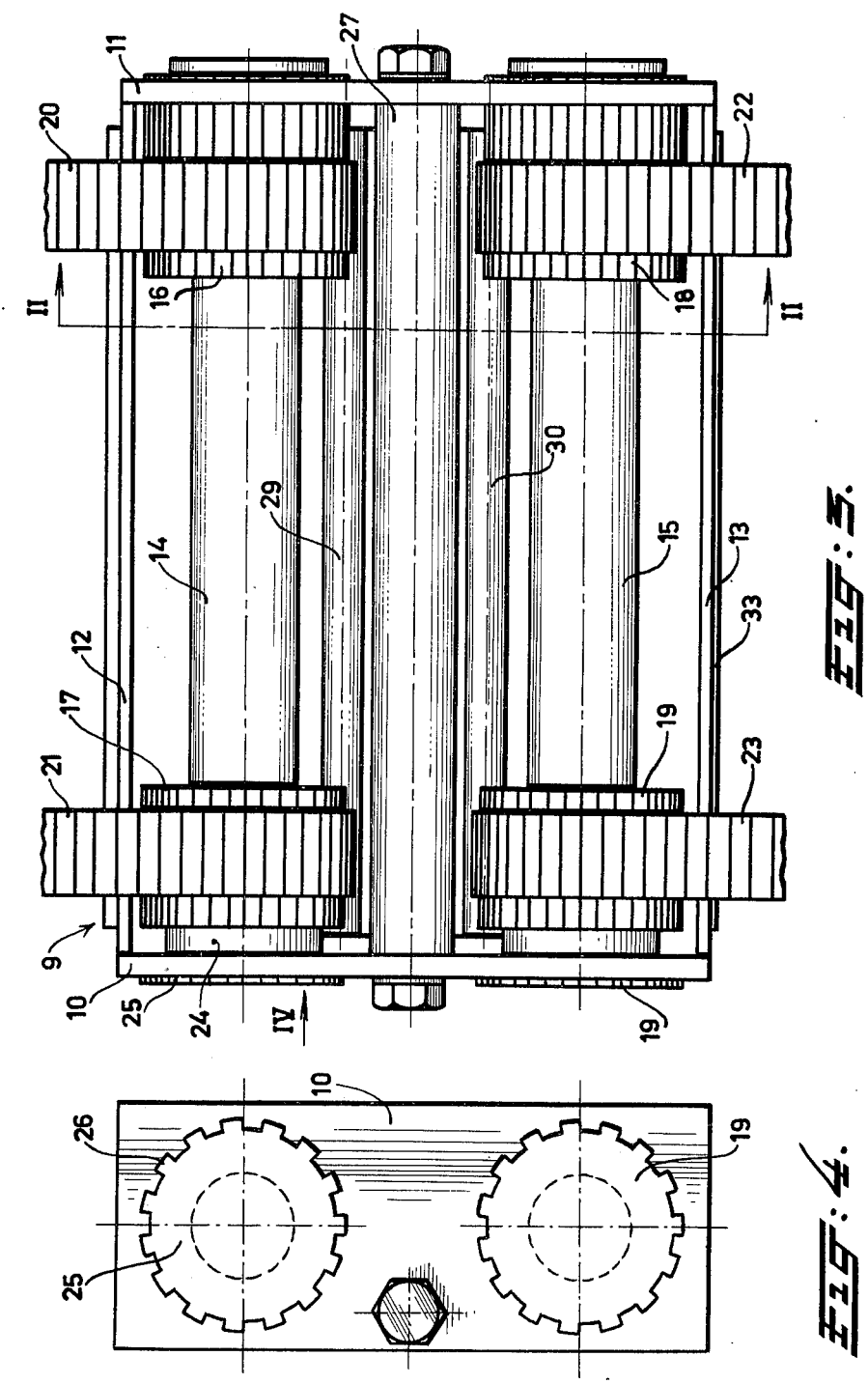

APPARATUS FOR CONTINUOUSLY PRODUCING SEALS IN TUBE-SHAPED PLASTICS FILM MATERIAL

BACKGROUND OF THE INVENTION

My invention relates to an apparatus for continuously producing seals in tubular plastics film material. Apparatus is known comprising means for supplying the web of material, at least one heating beam travelling along with the web and subsequently returning, means for keeping the web mechanically tension-free at the location where it is warm, means for keeping the heated film layers one against the other up to a pressing station, said pressing station comprising two rollers at least one of which is provided with cooling means, and finally, means for discharging the web.

In this prior apparatus the heating beam is arranged on a drum, implying that one is limited to a fixed spacing between the seals produced in the tube. In case the sealing is intended to produce bags with the tube material it is thus only possible to obtain bags of a certain length.

In practice bags of a great variety of lengthwise dimensions is wanted for various purposes, which makes it thus necessary to have one apparatus available for each bag length required.

Further apparatus is known already which is capable of producing seals in a film web with various mutual distances. Here a continuously circulating belt carries a plurality of heating beam support units. These units are held up, whereby they slip with respect to the ongoing belt, in order to be freed at an appropriate moment. This apparatus is disadvantageous in that it results in a poor accuracy of the distances between the seals produced.

SUMMARY OF THE INVENTION

The primary object of the present invention is to provide a machine which is readily adaptable to the different spacings between the seals, as required. A further object is to use the known idea of making the seals under no-tension, in order to obtain a good seal quality. Also it is an object of the invention to obtain a high degree of accuracy in the spacing between the seals produced.

According to my invention a plurality of heating beams is interconnected by flexible and longitudinally adjustable means such as belts so as to form an endless loop which is guided over and driven by appropriate adjustable tensioning rollers.

Preferably the adjustable interconnection between the beam supporting units comprises toothed belts cooperating with ratchet wheels in the heating beam supporting units. This favours obtaining identical distances between the successive units in the loop, because for this purpose use can be made of the ratchet pitch.

In another preferred embodiment of the apparatus two endless loops with units having mutually adjustable distances are provided, which are driven in opposite sense and which contact each other over a part of their run, the units on the second loop constituting counter pressure members for the heating beams on the first loop.

For certain applications it is advantageous when this idea is further elaborated in this way that the units on the second endless belts also support heating beams, so that two-sided seals can be made and a better sealing quality can be obtained.

In the apparatus mentioned in the first paragraph above under "Background of the invention" the tube pieces which were heated were made mechanically tension-free by means of minor differences in the rotational speeds of the various rollers or drums, respectively, combined with slipping at another location, but with the apparatus according to the present invention this can be implemented by providing each of the units supporting the sealing beams with means for making a section of the film web mechanically tension-free, whilst for the rest perfectly identical rotational speeds, or speeds of displacement, are applied everywhere.

It is advantageous when the said means comprise a flap of flexible material at least at the rear of the unit, said flap in unloaded condition extending substantially cross to the web direction, and projecting beyond the operative surface of the heating beam, and the extremity of which has a slightly curved shape in the sense of movement of the web. The use of such a flap has for effect that, at the location where the loops join in order to keep the film web between them, and to heat it, respectively, the flap of each unit is forced to bend in the direction in which the film web moves, whereby it will push the film slightly forward so that any tension existing in the material is eliminated. This condition is maintained up to the end of the loop path section where heating occurs, because there is no mutual slip between each of the units, the flap thereof and the contacting piece of the film web, but to the contrary they move on together.

SURVEY OF THE DRAWINGS

FIG. 2 can be thought of as a section according to the arrows II—II in FIG. 3;

FIG. 3 is a top view of a unit with parts of the toothed belts;

FIG. 4 is a side view according to the arrow IV in FIG. 3.

DESCRIPTION OF THE PREFERRED EMBODIMENT

Figure 1:
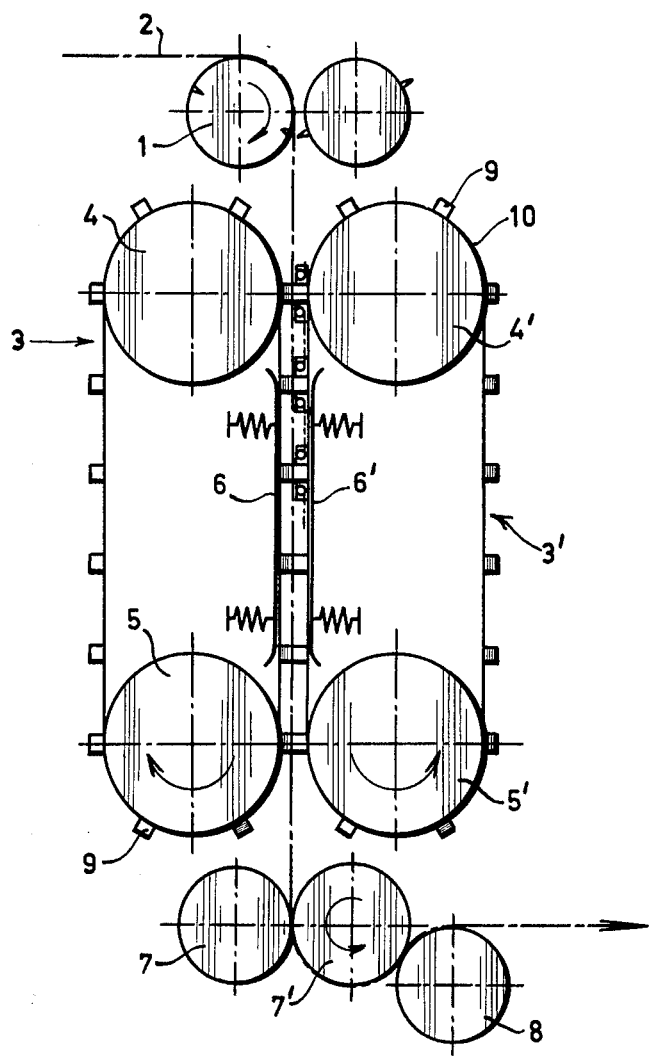
FIG. 1 represents in highly diagrammatic form an overall view of an embodiment of the apparatus according to the invention.

In the drawing FIG. 1 shows a single supply roller 1 for a web of film 2 in which seals are to be produced. The film web 2 moves in the direction of the arrow which has been drawn in it. The further parts of the supply device have a known structure so that they have been omitted in this drawing.

Two endless loops 3, 3' are guided over sets of guide rollers or drums 4,5 and 4',5' respectively. In view of the adjustability —yet to be described— of the length between the units, so the overall loop length, one guide roller in each of these sets can be tensioned or be made resilient. This may be done in known manner and has therefore not been further illustrated. Two straight sections of each of the loops 3,3' contact each other, pairs of guide members 6,6' being provided if desired between the pairs of guide drums 4,5 and 4',5', respectively, and in order to keep the said loop portions effectively one against the other. In this section the tube material is heated, in a manner yet to be described, and when leaving the pair of loops 3,3' the film web runs between two rolling cylinders 7,7', at least one of these, but preferably both being cooling cylinders of known structure. The cylinders 7,7' exert pressure on the two film layers, so that the heated portions will join into a good quality seal. Thereupon the web 2 is discharged by means of a roller 8 and further means which are known in the art and have therefore not been represented.

In FIG. 1 it is visible that each of the loops 3,3' comprises 16 sealing units, generally designated in FIG. 1 by 9, all of these units being interconnected by means of flexible strips or belts 10. By adjusting the length of each such belt 10 the mutual distance between successive units 9 can be adjusted at a desired value, as will now be described with reference to FIGS. 2–4 incl.

Figure 2:
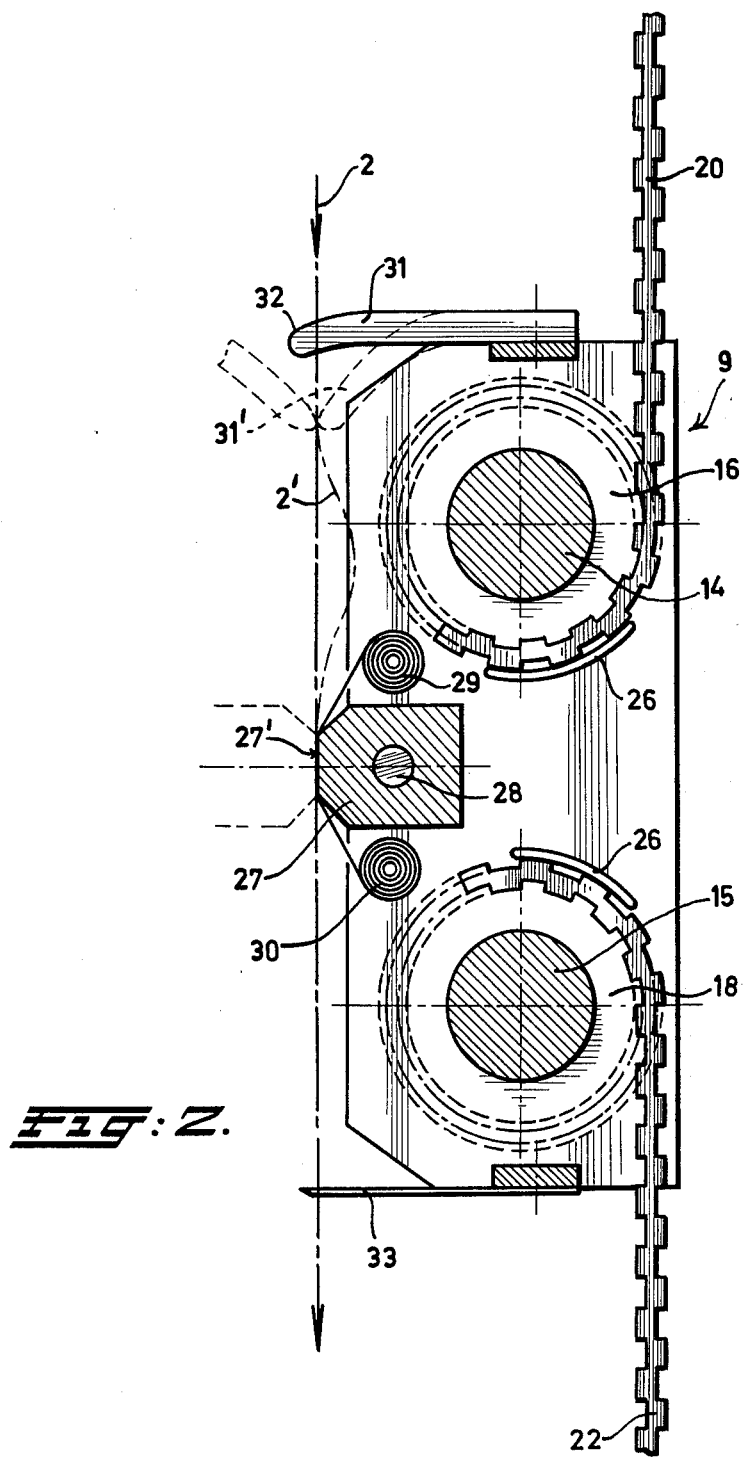
FIG. 2 represents, on a greatly enlarged scale, a detail comprising a unit from one of the loops, supporting a heating beam and showing part of the toothed belts for the adjustable interconnection with subsequent units in the loop.

FIGS. 2–4 incl. show a single unit 9 supporting a heating beam. The unit is constructed with two-side plates 10,11, interconnected by cross plates 12,13 so as to constitute a rectangular frame. Between the side plates two axles are arranged. Each of these axles 14,15 carries a pair of ratchet wheels 16,17 and 18,19 respectively, the axial width of which is sufficient for carrying parts of toothed belts 20,21 and 22,23 respectively. These toothed belts do not constitute closed loops but they are pieces of a certain unit length, as will be further clarified.

In FIG. 3 it is visible that the ratchet wheel 17 adjacent the side plate 10 has a circumferential groove of a depth at least equal to the height of the ratchets or teeth, said groove being referenced by 24. Further outwardly the ratchet wheel portion 25 persists and projects through an aperture 26 in the side plate 10, said aperture 26 being shaped so as to correspond with a cross section through the ratchet wheel 17, 25 (see also FIG. 4).

In the position of the ratchet wheel 17,25 in FIG. 3 therefore the wheel cannot be rotated anymore because its ratchets or teeth are engaged in aperture 26. By a slight axial displacement of the wheel 17, however, groove 24, the width of which at least equals the thickness of plate 10, will arive in aperture 26, so that now the wheel can be rotated indeed and in the end be pushed back in a different position. In FIG. 3 it is also visible that the other ratchet wheel on the same axle 14 is not provided with a groove similar to 24, but is continuous and engages in an aperture in plate 11 also having a similar toothed circumference. When fastening both ratchet wheels 16,17 onto axle 14 it is possible, by displacing the joint elements 14,16,17 over a certain distance to the left, as seen in FIG. 3, to also disengage ratchet wheel 16 from its engagement in side plate 11, in order to change the position of the ratchet wheels.

An entirely similar construction has been applied for the lower axle 15 with the pair of ratchet wheels 18,19.

Especially in FIG. 2 it is visible that each toothed belt such as 20 has a certain number of teeth engaging the concerned wheel such as 16. By selecting the position of the axle 14 with the wheels such as 16 relative to the side plates 10,11 of unit 9 it can thus be determined which part of their length of belts such as 20 is drawn into the interior of the unit so as to be wound to a greater or lesser extent onto the ratchet wheel concerned. This determines the length of the remaining portion of each belt such as 20, and consequently also the mutual distance between successive units. The use of ratchet wheels and toothed belts is very advantageous in that it is quite simple to obtain identical distances between all of the successive units 9 in the loop, because one need only count the number of teeth, when making a re-adjustment for adaptation of the machine to a different seal spacing. Moreover the length, once being adjusted, has a fully fixed value because any sliding displacement of the ratchet wheels with respect to the toothed apertures in the side plates is naturally excluded.

As distinguished from the embodiment represented it is alternatively possible to arrange just one single ratchet wheel on each axle and to operate with one single belt, and a sufficient axial width is taken for the two. Also it is optional to apply just one single adjustable rod such as 14 having ratchet wheels, the other end of the belt or the end of the other belt respectively being simply affixed permanently to the frame. By this, however, the variation in the applicable mutual distance between the units will be limited to half the adjustability in case the two extremities of each belt are made adjustable.

In FIG. 2 it is further visible that a curved guide plate such as 26 is provided, extending over the end of each toothed belt. This securely prevents disengagement from the belt and the ratchets of the ratchet wheel. This risk is not likely to exist during operation, when the complete loop is under tension, but it is there when the tension in the loop is taken away in order to rearrange the apparatus for different size. The guide member 26 on the other hand does have a certain distance from the top surface of the belt, so that the rotary adjustment of the ratchet wheel and the belt below the guide plate 26 is always possible without friction.

Further in FIG. 2 and 3 the heating beam 27 is visible, being arranged between the side plates 10,11 and in the interior of which the heating element 28 proper is arranged in the usual manner.

On either side of the heating beam 27 two more small rollers 29,30 may be provided between the side plates, over which a teflon cloth is stretched which can be moved intermittently by supplying it from one of the rollers and winding it on the other one, and which constitutes a protection between the sealing beam 27 and the plastics material which has to be sealed.

Further it is visible especially in FIG. 2 that at the rear of unit 9 (relative to the sense of movement of the web 2 a flap 31 of flexible material such as rubber is arranged substantially over the full width. The main direction of this flap 31 is perpendicular to the plane of web 2, and the length of it has been selected such that the flap end projects slightly beyond the normal location of web 2, i.e. substantially in the same plane as the operative surface 27' of the sealing beam 27. In the section where the loop 3,3' circulates freely flap 31 is free to occupy the position drawn in full lines in FIG. 2. When the two loops are approaching, so in the top region in FIG. 1, the two corresponding flaps on the encountering units will abut. Because of a curved configuration of the extremity 32 of flap 31, to wit in FIG. 2 downwardly, so in the same direction as the direction of travel of web 2, the flaps such as 31 will be forced to assume the position drawn in broken lines in FIG. 2 and indicated by 31'. This will have for effect that the web will be pulled on, or better said pushed on, in the direction of travel, as represented in an exaggerated extent by the line 2', having for consequence that any mechanical tension in the web at the location of the heating beam 27 will be eliminated.

Preferably this is combined with a feature for positively keeping the web at the front of the unit (so in the lower region in FIG. 2). For this purpose the embodiment sketched shows a perforating blade 33, also perpendicular to the plane of web 2, and having dimensions such that the edge of the blade will point through the web. As a matter of course this will occur at the moment at which two opposite units will approach, on top of FIG. 1. Further it will be understood that the opposite unit in the other loop does not have a similar blade; as regards the rubber flap 31 corresponding elements are present in both loops. Alternatively the perforating blade 33 may be replaced with a flexible flap similar to flap 31, shaped symmetrical with respect to the central plane of unit 9 which requires the units in the opposite loop to also have a corresponding flap. In this way a similar displacement of the web 2 over a short distance, sufficient to eliminate any tension, can be brought about in opposite sense.

In any case the web will remain entirely free of tension in the section adjacent unit 9 over the entire distance where heating takes place, so in the central area where the two loops 3,3' are in contact.

Finally it is pointed out that there are two variants in the realization In one variant only beams 27 in all units of one of the loops, e.g. the right hand loop 3', have heating elements, the units in the left hand loop 3 then having an entirely corresponding shape, but the beams like 27 just acting as counter pressure elements. Thus one-sided sealing is effected. The other variant is that the elements in the two loops 3,3' are made fully identical, so that two-sided seals can be made. In this case preferably not only pressure cylinder 7' (see FIG. 1) will be made a cooling cylinder but also cylinder 7.

In case one wants to apply extremely high web travelling speeds it might occur that the effect of the cooling cylinder 7,7' is not sufficient. Under such circumstances it is possible to provide for a belt or table between cylinders 7,7' and discharge roller 8, where the seals will get a sufficient time delay for the temperature to fall below a critical value. Such table might even be of rather short length when the web leaving cylinder 7,7' is piled zigzagwise, while the lowermost layers are continuously drawn away by roller 8.

In operation of the apparatus represented the double web 2 is continuously supplied by the action of the rollers 1, the travelling speed being substantially equal to the travelling speed of the units 27 on the two loops 3,3' which are driven and guided by and over the pairs of rollers 4,5 and 4',5', respectively. In the central region the web is clamped between pairs of encountering units 9 and simultaneously heating elements 28 heat the web material, which is made tension-free, thus initiating the sealing process of the two layers contacting each other. The sealing is finished when the web, still having substantially the same travelling speed as before, passes between pressure rollers 7,7', said rollers at the same time cooling the heated material. Finally the discharge roller takes care of discharging the web with still the same travelling speed.

What I claim is:

1. Apparatus for continuously producing seals in tube-shaped plastics film material, comprising means for supplying the web of material, at least one heating beam travelling along with the web and subsequently returning, means for keeping the web mechanically tension-free at the location where it is warm, means for keeping the heated film layers one against the other up to a pressing station, said pressing station comprising two rollers at least one of which is provided with cooling means, and finally, means for discharging the web, a plurality of heating beams being provided which are interconnected by flexible and longitudinally adjustable means such as belts so as to form an endless loop which is guided over and driven by appropriate adjustable tensioning rollers.

2. Apparatus according to claim 1, wherein the adjustable interconnection between the beam supporting units comprises toothed belts cooperating with ratchet wheels in the heating beam supporting units.

3. Apparatus according to claim 1, wherein two endless loops with units having mutually adjustable distances are provided, which are driven in opposite sense and which contact each other over a part of their run, the units on the second loop constituting counter pressure members for the heating beams on the first loop.

4. Apparatus for continuously producing seals in tube-shaped plastics film material, comprising means for supplying the web of material, at least one heating beam travelling along with the web and subsequently returning, means for keeping the web mechanically tension-free at the location where it is warm, means for keeping the heated film layers one against the other up to a pressing station, said pressing station comprising two rollers at least one of which is provided with cooling means, and finally, means for discharging the web, a plurality of units being provided each of said units comprising two side plates between which, apart from a heating beam, at least one axle is arranged supporting at least one ratchet wheel which is engaged in an aperture, having a correspondingly toothed circumference, in one of the side plates, between the said ratchet wheel and the said one side plate a relative axial shiftability being provided so as to allow for freeing the ratchet wheel and rearranging it in a different position, and further each of the ratchet wheels being engaged by at least one tooth of a toothed belt, all of the units thus being interconnected by similar belt so as to constitute a closed loop with adjustable effective spacing between the units.

5. Apparatus according to claim 4, wherein each said axle supports two ratchet wheels for toothed belts, at least one of which can be engaged in a toothed aperture in said one side plate.

6. Apparatus according to claim 4, wherein each unit has two axles with ratchet wheels on either side of the heating beam.

7. Apparatus according to claim 4, wherein a protecting plate is provided, overlying the belt portion which engages the ratchet wheel for preventing the belt teeth to disengage from the ratchets on the wheel, but permitting adjustment of the wheels with the belt portions engaged thereby.

8. Apparatus according to claim 4, wherein two endless loops with units having mutually adjustable distances are provided, which are driven in opposite sense and which contact each other over a part of their run, the units on the second loop constituting counter pressure members for the heating beams on the first loop.

9. Apparatus according to claim 8, wherein the units on the second endless loop also support heating beams in view of executing a two-sided sealing operation.

10. Apparatus according to claim 8, wherein guide members are provided over at least a portion of the run where the loops face each other and where they are heated, respectively.

11. Apparatus according to claim 4, wherein each of the units is provided with means for making and keeping a portion of the film web mechanically tension-free.

12. Apparatus according to claim 11, wherein said means comprises a flap of flexible material at least at the rear of the unit, said flap in unloaded condition extending substantially cross to the web direction, and projecting beyond the operative surface of the heating beam, and the extremity of which has a slightly curved shape in the sense of movement of the web.

13. Apparatus according to claim 12, wherein at the front of each of the units in one of the loops a perforating blade is arranged, also substantially cross to the web direction and projecting slightly beyond the plane of the heating beam.

14. Apparatus according to claim 12, wherein a similar flap is arranged at the front of each of the units, having a configuration symmetrical to the first one with respect to the plane through the heating beam perpendicular to the film web.

15. Apparatus according to claim 4, wherein each of the units is provided with a supply roller and a winding roller for teflon cloth which is stretched over the operative surface of the heating beam.

16. Apparatus for continuously producing seals in tube-shaped plastics film material, comprising means for supplying the web of material, at least one heating beam travelling along with the web and subsequently returning, means for keeping the web mechanically tension-free at the location where it is warm, means for keeping the heated film layers one against the other up to a pressing station, said pressing station comprising two rollers at least one of which is provided with cooling means, and finally, means for discharging the web, a plurality of units being provided each of said units comprising two side plates between which, apart from a heating beam, at least one axle is arranged supporting at least one ratchet wheel which is engaged in an aperture, having a correspondingly toothed circumference, in one of the side plates, between the said ratchet wheel and the said one side plate a relative axial shiftability being provided so as to allow for freeing the ratchet wheel and rearranging it in a different position, and further each of the ratchet wheels being engaged by at least one tooth of a toothed belt, all of the units thus being interconnected by similar belt so as to constitute a closed loop with adjustable effective spacing between the units, a collecting table or belt being arranged between the cooling pressure cylinders and the further discharge rollers.

* * * * *